United States Patent [19]
Steinhagen

[11] 3,722,644
[45] Mar. 27, 1973

[54] TORQUE LIMITING COUPLING

[75] Inventor: Horst G. Steinhagen, Racine, Wis.

[73] Assignee: Twin Disc, Incorporated, Racine, Wis.

[22] Filed: Jan. 31, 1972

[21] Appl. No.: 221,935

[52] U.S. Cl. .................................... 192/56 R, 64/29
[51] Int. Cl. ............................................. F16d 43/20
[58] Field of Search ................. 192/56 R, 150; 64/29

[56] References Cited

UNITED STATES PATENTS

| | | | |
|---|---|---|---|
| 3,080,029 | 3/1963 | Stober | 64/29 X R |
| 3,305,058 | 2/1967 | Orwin et al. | 64/29 X R |
| 3,429,407 | 2/1969 | Orwin et al. | 64/29 X R |

*Primary Examiner*—Allan D. Herrmann
*Attorney*—James E. Nilles

[57] ABSTRACT

A torque limiting coupling having a driving member and a driven member and which limits the amount of torque transmitted between the members. When excessive torque is attempted to be transmitted, the coupling is released and over-runs freely until the coupling is reset by causing reversal of its relative direction of rotation. The coupling utilizes a plurality of balls which act between pockets in the two opposing members, thereby causing axial separation and release of the coupling when one of the members rotationally moves relative to the other.

8 Claims, 22 Drawing Figures

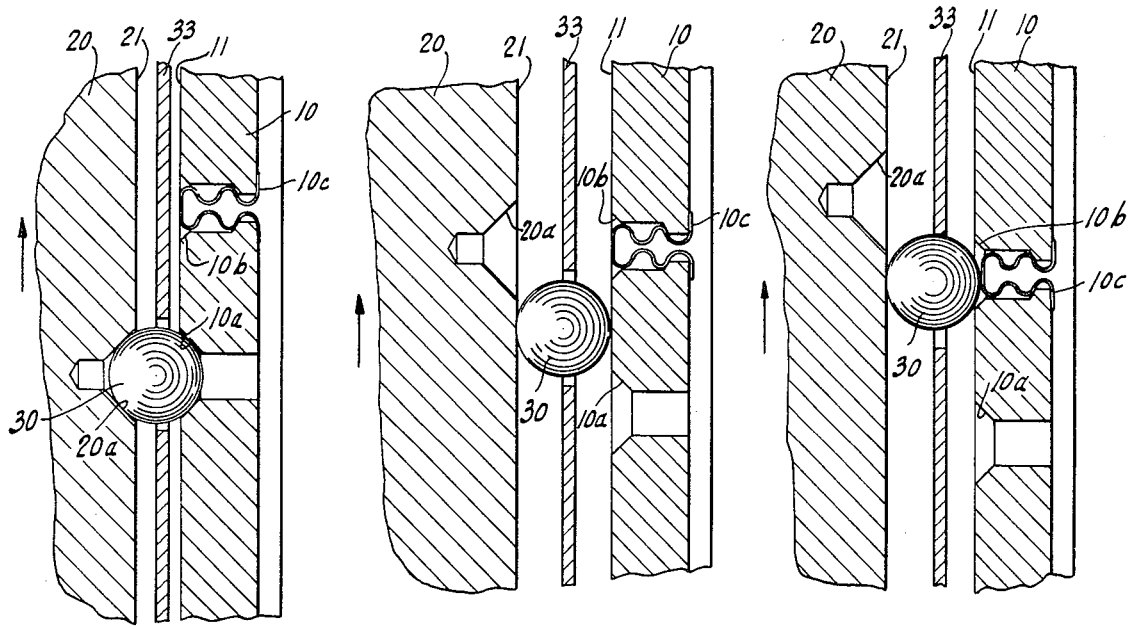
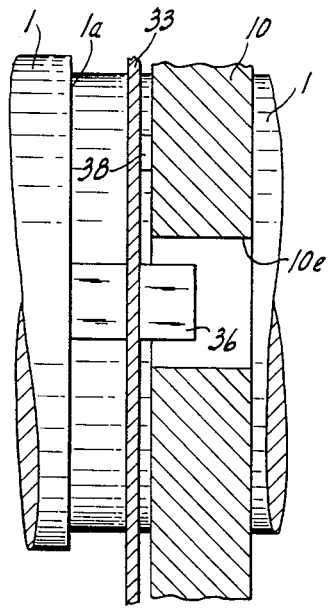
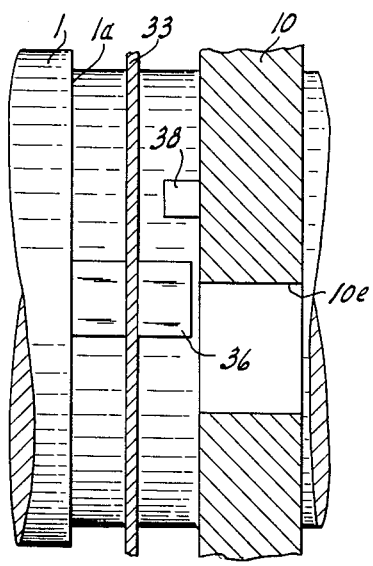
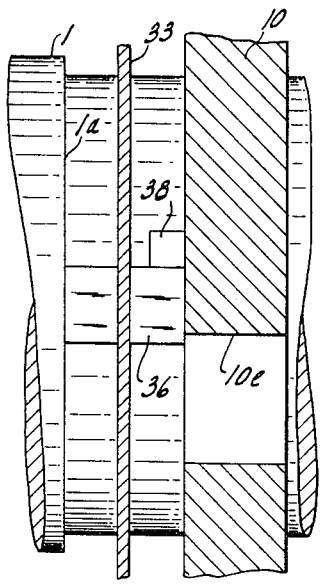

TORQUE LIMITING COUPLING

BACKGROUND OF THE INVENTION

The invention pertains to torque limiting couplings such as overload clutches having driving and driven clutch members connected together by torque transmitting balls and which engage in torque transmitting pockets in axially opposed faces of the driving and driven members. The members are mounted for relative axial displacement away from one another against resilient means, such as a spring, which urges the members towards one another.

An example of one type of prior art over-load clutch is shown in the U.S. Pat. No. 3,305,058 which issued Feb. 21, 1967 to Orwin et al. and is entitled "Overload Clutch". This and many other types of torque limiting clutches have been used with a reasonable degree of success.

One of the problems however in the prior art devices was the difficulty encountered in attempting to reset the coupling after it had been released. Such resetting often necessitated the use of tools to urge the balls to their previous position in their respective driving slots and it was difficult to force the balls into alignment with their ramps and cages. Furthermore, when a device such as shown in the U.S. Pat. No. 3,305,058 was released, the balls continued to roll around and did not provide complete release of the unit without some drag effect. Additionally, many of the prior art devices were incapable of being reset from any point in the power drive line and could not be reset automatically.

SUMMARY OF THE PRESENT INVENTION

The present invention provides a torque limiting coupling which is capable of functioning in either direction of rotation. After the coupling has been disengaged due to excessive torque, it over-runs freely and can run in the disengaged condition for extended periods of time without damage.

In addition, the coupling provided by the present invention can be reset simply by reversing the relative direction of rotation of the drive and driven members. Because of this ability to be reset by simply reversing direction of rotation, such resetting can be accomplished from any point in the power drive line.

The coupling provided by the present invention is completely sealed against foreign matter and need not be opened to be reset. The amount of torque required for release is accurately maintained and is not appreciably affected by rotational speed or vibration. Furthermore, the amount of torque required for release can be easily adjusted.

These and other objects and advantages of the present invention will appear hereinafter as this disclosure progresses, reference being had to the accompanying drawings.

BRIEF DESCRIPTION OF THE DRAWINGS

FIG. 5 is an enlarged, fragmentary cross sectional view, of a portion of the coupling shown in FIG. 1, but in a flat lay-out position, and showing the position of one of the torque transmitting balls when it is located in the driving pockets of the driving and driven members when in torque transmitting condition;

FIG. 6 is a cross sectional view taken along line 6—6 in FIG. 1 and under the same operating conditions as in the FIG. 5 showing;

FIG. 7 is a view similar to FIG. 5, but showing the condition when excessive torque was applied and one of the members when it has rotated relative to the other so as to cause the balls to move out of their driving pockets so as to axially separate the driving and driven members;

FIG. 8 is a view similar to FIG. 6, but showing the position of the parts when the FIG. 7 condition exists;

FIG. 9 is a view similar to FIGS. 5 and 7, but showing the coupling when the members have rotated relative to one another to a position in which the ball has been engaged in the reset pocket of the driving member;

FIG. 10 is a view similar to FIGS. 6 and 8, but when the members have rotated relative to one another as shown in FIG. 9, and wherein the key fixed on the ball cage is holding an axially shiftable plate of the driving member a spaced distance from a shoulder on the driving shaft;

FIG. 20 is a view similar to a corresponding portion shown in FIG. 1;

FIG. 21 is a view of a reset pocket in member 10 of FIG. 20; and

FIG. 22 is a cross sectional view taken along line 22—22 in FIG. 20, but laid out in a flat position.

DESCRIPTION OF A PREFERRED EMBODIMENT

Figures 1, 16:
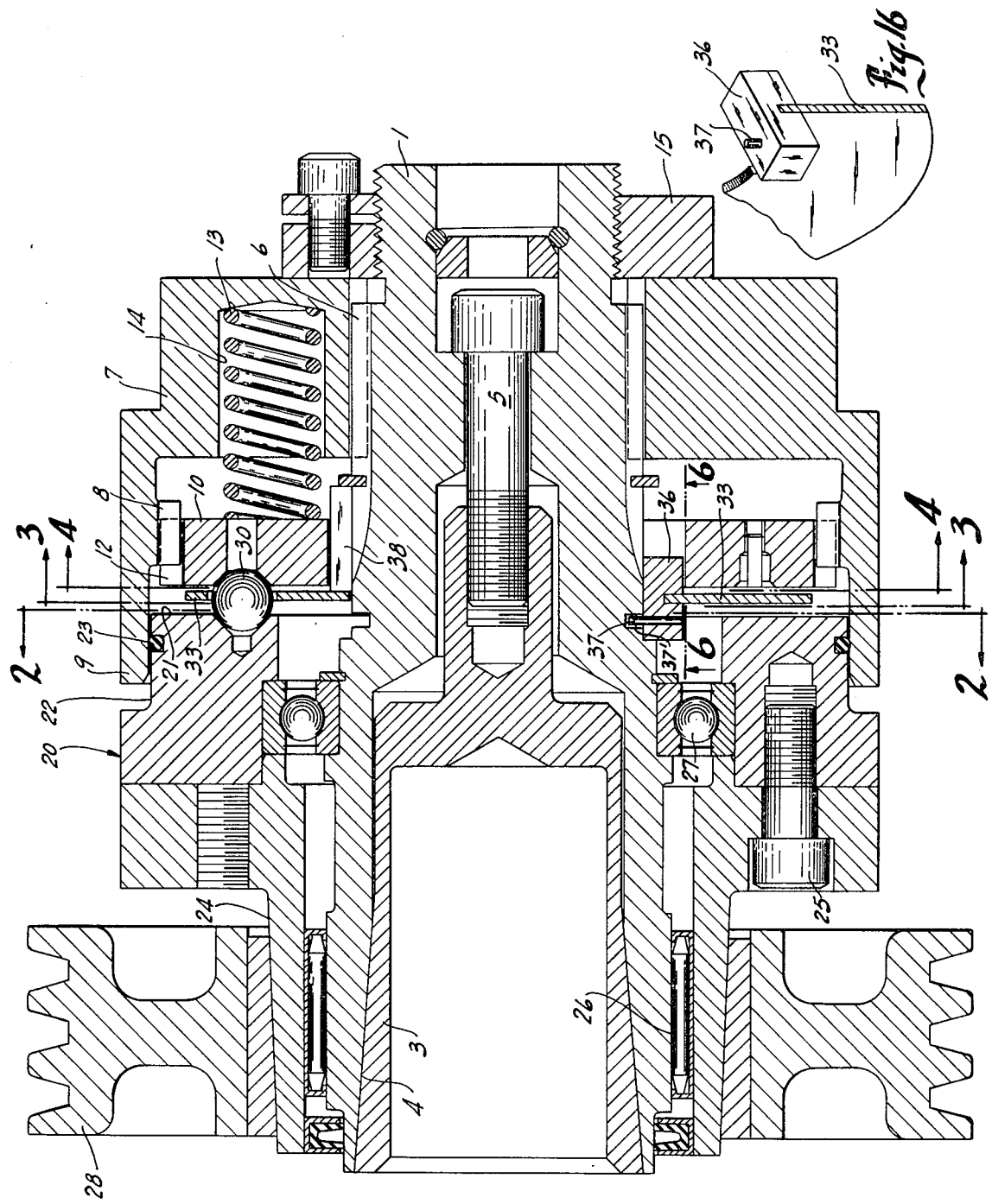
FIG. 1 is a longitudinal, cross sectional view through a torque limiting coupling embodying the present invention.
FIG. 16 is a fragmentary, perspective view of the key on the ball cage.

A torque limiting coupling has been shown in FIG. 1 for the purpose of illustrating the present invention and includes a driving member in the form of a driving shaft 1 which receives its power from a power shaft (not shown) connected by means of the tapered collet 3 located within and cooperating with the taper 4 of the driving member 1. The collet is adjustable in the usual manner by the screw 5 so as to form a driving engagement between the driving member 1 and its power source (not shown). The driving shaft 1 has an external spline 6 around its periphery and to which is splined a drum 7. The drum in turn has a series of internal teeth 8 on the inner surface of its axially extending flange 9 and a driving plate 10 has external teeth 12 by means of which it is in constant mesh with the teeth 8. Thus, the input driving shaft 1, the drum 7, and the axially shiftable plate 10 all rotate together as the driving member.

A plurality of springs 13 are located in circumferentially spaced pockets 14 in the drum 7 and bear against the plate 10 and resiliently load it to the left as viewed in FIG. 1. The resilient load of the springs 13 can be adjusted by means of the adjusting nut 15 that is threadably engaged on the end of the shaft 1.

Figure 4:
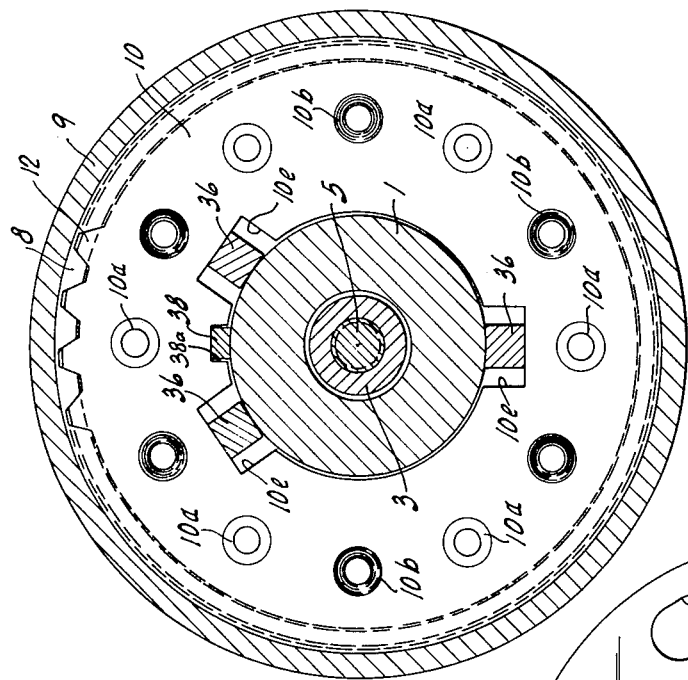
FIG. 4 is a transverse, cross sectional view taken along line 4—4 in FIG. 1 and showing the ball engaging surface of the driving member.

The plate 10, as shown in FIG. 4, has a series of circumferentially spaced driving pockets 10a formed in its transverse surface 11 and evenly spaced from one another. The plate 10 also has a series of evenly spaced reset pockets 10b, some of which have a spring 10c therein.

The driven member of the coupling includes an annular ring 20 having an external peripheral surface 22 that is located within the flange 9, and a seal 23 is located between the surface 22 and the inner surface of the flange 9 so as to completely seal the coupling.

Figure 2:
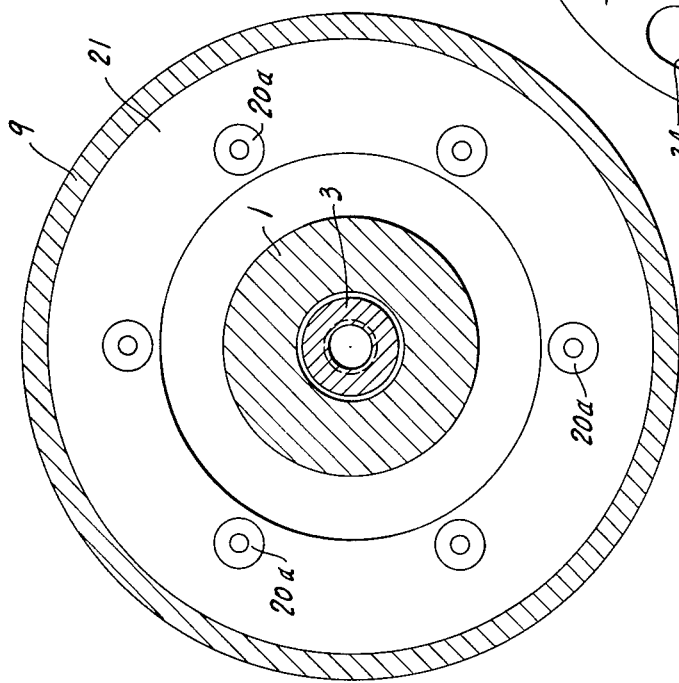
FIG. 2 is a transverse sectional view taken along line 2—2 in FIG. 1 and showing the ball engaging surface of the driven member.

The driven ring 20 has a transverse surface 21 that opposes surface 11 of the plate 10. As shown in FIG. 2, a series of drive pockets 20a are formed in evenly, circumferentially spaced locations in the surface 21 of ring 20.

The driven member also includes a tapered hub portion 24 which is rigidly fixed to the ring 20 by means of the cap screws 25. The driven member in general is journalled by means of the anti-friction needle bearing assemblies 26 and the anti-friction ball bearing assemblies 27 which are located on the periphery of the driving shaft 1.

Means are provided on the driven member so as to transmit power therefrom, and this means has been shown as a sheave 28 which is fixed to the hub 24 for rotation therewith. Other transmitting means may be used such as sprockets, gears, pulleys, or other members, and furthermore, other forms of driving and driven members may be employed.

Figure 3:
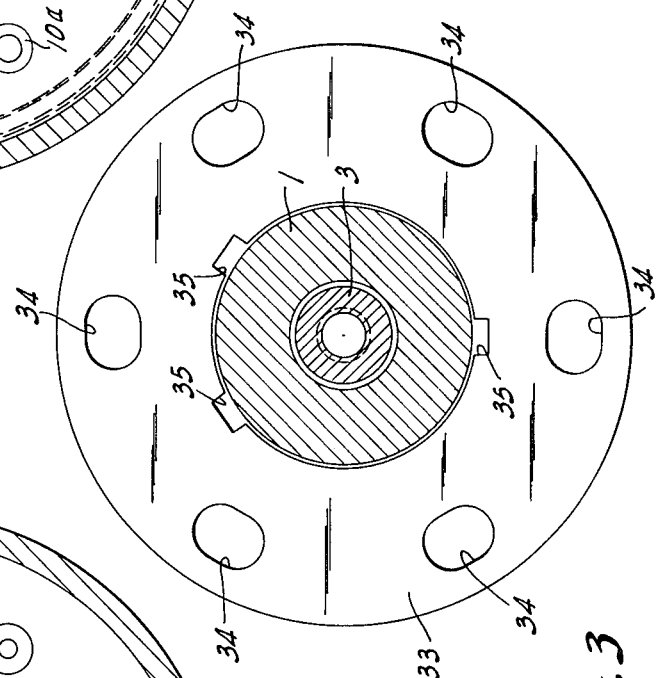
FIG. 3 is a transverse, cross sectional view taken along line 3—3 in FIG. 1 and showing the ball cage.

Torque transmitting and torque limiting means are provided between the driving plate 10 and the driven ring 20 and this means includes a series of hardened steel balls 30 which are adapted to ride against the surfaces 11 and 21 of members 10 and 20 and also drop into the driving pockets 10a and the reset pockets 10b of plate 10 and the drive pockets 20a of ring 20. A ball cage 33 has a plurality of generally elongated openings 34 circumferentially spaced therearound, as shown in FIG. 3. The cage 33 also has three circumferentially spaced key-ways 35 in which are fixed the keys 36 so that they extend from either side of the cage. A pin 37 (FIG. 1) extends through each of the three keys 36 and into a peripheral groove 37' of shaft 1 to hold the cage axially fixed on the shaft. The cage assures that the balls all move simultaneously and acts to support the balls against centrifugal forces and this feature renders the torque setting of the coupling independent of rotational speed. Furthermore, the pockets 34 in the cage 33 can be shaped in such a manner that the radially outer support of the balls is not located on the centerline of the balls, but rather in a direction towards the ring 20. Such a disposition of the cage relative to the balls would cause the balls to be urged towards the reset springs 10c when centrifugal force acts on the balls. This would permit the ring 20 to rotate completely freely above a predetermined rotational speed.

FIGS. 5 to 15 show the various positions of the driving member 10 and the driven member 20 relative to one another under certain operating conditions.

In FIG. 5, the balls 30 are shown as being located in the drive pockets 10a and 20a of members 10 and 20, respectively. This is the normal torque transmitting, driving relationship between the parts. In this position, torque may be transmitted in either direction of rotation of the coupling.

The transmittable torque is a function of the ball ramp angle $a$ (alpha), ball pitch radius, and the force produced by the springs 13.

When the applied torque exceeds the predetermined amount of torque set in the coupling, the balls 30 begin to roll out of the pocket 10a and 20a and the members 10 and 20 are thus forced apart as shown in FIG. 7 against the compression of springs 13. As shown in FIG. 6, when the parts are in the driving relationship shown in FIG. 5, the key 36 which is rigidly attached to the cage 33 is located within one of the radially extending openings 10e in the plate 10. The other end of the key 36 is abutting against a shoulder 1a of the shaft 1. In this position, the key 36 is ineffective.

Referring to FIG. 8 which is the position of the plate 10 relative to the shoulder 1a when the coupling is in the position shown in FIG. 7, here it will be noted that the key 36 has been withdrawn from the opening 10e of plate 10. It will be noted that the length of the key 36 is less than the space between the plate 10 and shoulder 1a of the shaft when the coupling is in the position shown in FIG. 8.

As the plate 10 and ring 20 rotate relative to one another further as shown in FIG. 9, the balls 30 drop only partially into the reset pockets 10b of the plate 10 which also contain the light reset springs 10c. In other words, it is only necessary for the balls 30 to move into the pockets a small distance in order for the keys 36 to become effective. The reset torque would become too high if the balls roll too deep into the reset pockets. In any event, this movement of the balls into the pockets slightly, causes the plate 10 to move towards the ring 20 due to the action of the springs 13. This movement reduces the space between plate 10 and ring 20. As shown in FIG. 10 the key 36 has moved out of the recess 10e and because the space between the plate 10 and ring 20 is reduced, the key 36 then prevents any further reduction of the space between plate 10 and ring 20. In other words, the force of the springs 13 is taken by the key 36 against the shoulder 1a of the shaft, and the balls 30 are thus unloaded except for the very small force of the reset springs 10c. Therefore, the ring 20 can rotate freely on its supporting anti-friction bearings. Cage 33 is prevented from further rotation due to the frictional forces acting on the keys 36. To further prevent rotation of the cage 33 beyond the desired position, another key 38 is fixed in a corresponding key-way 38a in plate 10. In other words, the key 38 rests on the periphery of shaft 1 and is so positioned that it is contacted by one of the keys 36 and thus provides a positive stop in a rotational direction for the cage 33.

Figure 11:
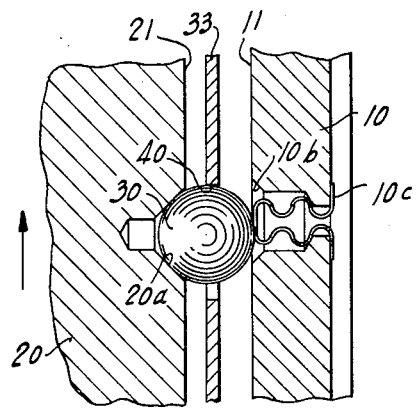
FIG. 11 is a view similar to FIGS. 5, 7 and 9, but showing the members when the coupling is overrunning and a pocket of the driven member matches up with a reset pocket of the driving member and the spring pushes the ball out of the reset pocket.

Upon further rotation of the members relative to one another from that shown in FIG. 9, the balls 30 will be forced into the next succeeding pocket 20a by the light reset springs 10c as shown in FIG. 11. The face edge 40 of the cage pockets prevent rotational movement of the balls 30. The forces acting on the balls in that position are shown in FIG. 12 and it will be noted that the pocket angle or ramp angle $\alpha$ (alpha) must be selected small enough to allow the balls 30 to slide axially against face 40, compress springs 10c, and allow further rotation of the ring 20.

Figure 12:
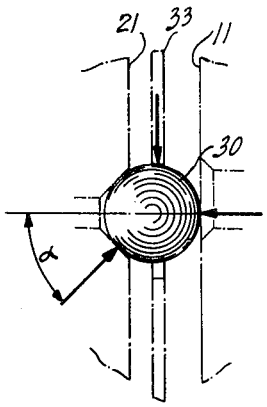
FIG. 12 is a schematic view of the ball when located in the position shown in FIG. 11 and showing the force vector which acts on the ball.

In FIGS. 11 and 12 it will be noted that the space between surfaces 11 and 21, in the released position, is just slightly less than the ball diameter.

Figure 13:
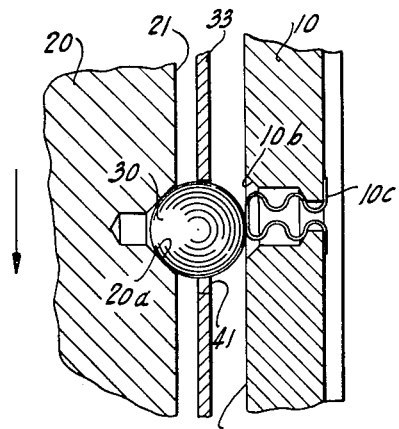
FIG. 13 is a view similar to FIG. 11, but showing the direction of rotation of the members reversed from the FIG. 11.
Figure 14:
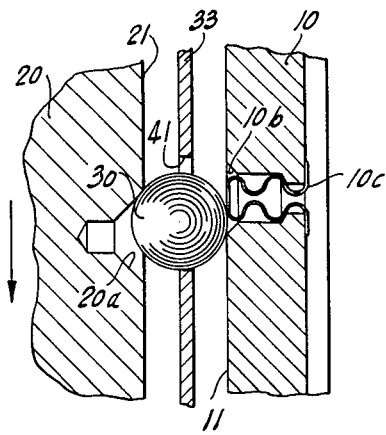
FIG. 14 is a view similar to FIG. 13, but showing the position of the ball when it has been moved out of the reset pocket, thereby forcing the driving and driven members to axially separate.
Figure 15:
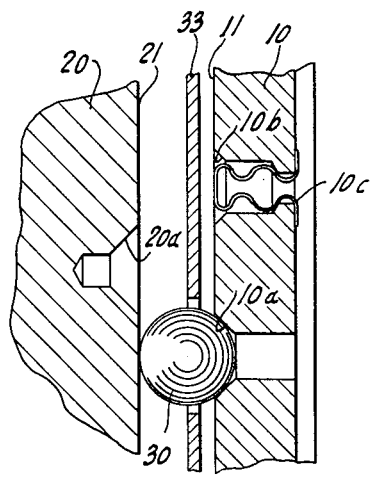
FIG. 15 is a view similar to FIG. 14 and showing the coupling in the reset position after which it can be driven in either direction.

To reset the coupling, the relative direction of rotation must be reversed and this action is shown in FIG. 13. Here again, as in FIG. 12, the balls are out of the reset pockets due to the spring force of springs 10c.

When the pockets 20a of ring 20 are in axial alignment with the balls 30, the reset springs 10c will push the balls into the pockets 20a as shown in FIG. 13. The balls can move circumferentially because of the elongated openings 34 of the cage. In other words, as shown in FIG. 13, the space 41 in the openings 34 permit the ball to travel relative to the cage.

Further rotation of the ring 20 relative to plate 10 will wedge the balls between the edge of the pockets 20a and 10b. Under these conditions where the ball gets ahead of the pocket 10b, the balls cannot go back into the pockets and therefore the plates must separate.

Further rotation of the ring 20 will force the plate 10 against the springs 13, thus releasing the keys 36 and the cage 33. The clearance between the balls and the cage openings 34 must be large enough to permit the balls to return to this position, thereby releasing the cage, otherwise the friction resistance of the cage would force the balls back into pockets 10b. Further rotation of the ring 20 relative to plate 10 permits the balls to roll back into the drive pockets 10a of plate 10 (FIG. 15) and finally also into successive pockets 20a of ring 20. FIG. 5 is the final reset position and the coupling can then drive in either direction after this resetting operation.

Figure 17:
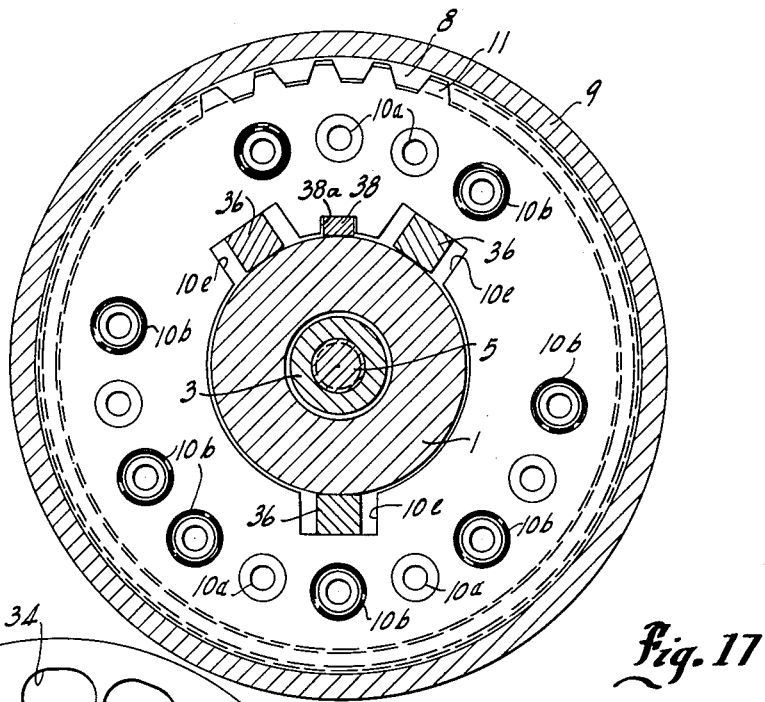
FIG. 17 is a view similar to FIG. 4, but showing a modification of the driving plate which utilizes uneven spacing of the pockets whereby the members can be in driving position for only one relative circumferential relationship to one another.
Figure 19:
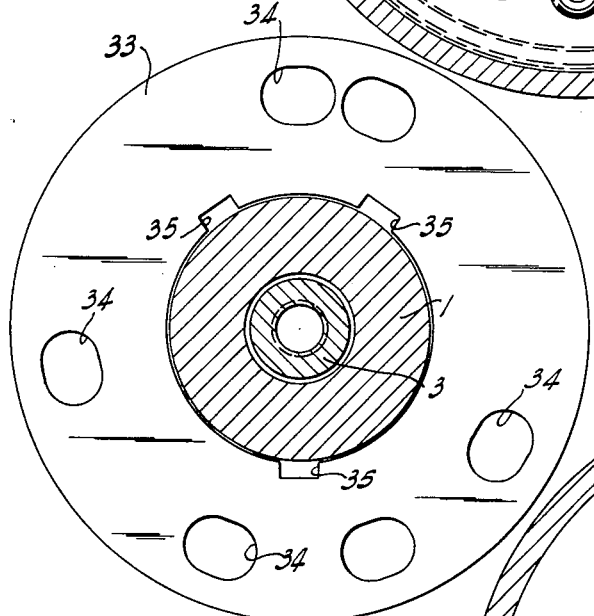
FIG. 19 is a view similar to FIG. 3 but showing the pocket spacing of the cage when used with the FIG. 17 modification.
Figure 18:
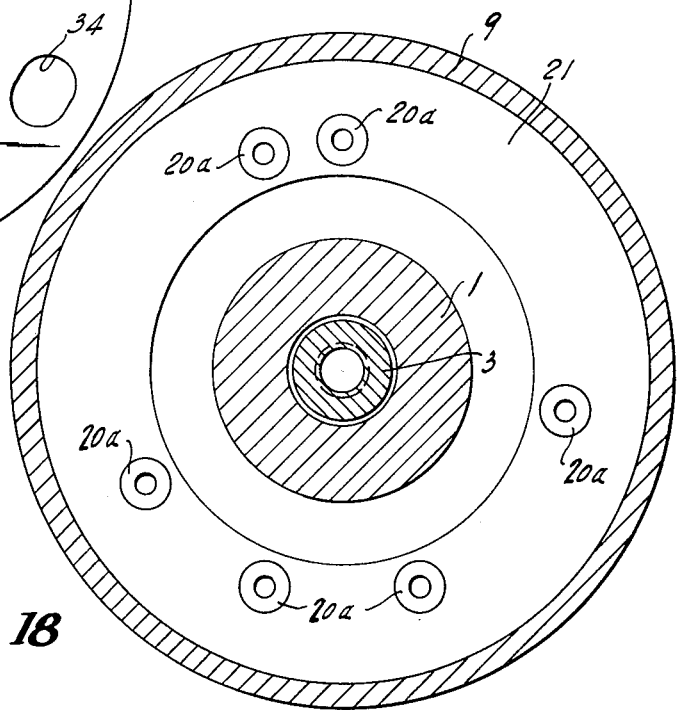
FIG. 18 is a view similar to FIG. 2 but showing the pocket spacing of the driven member when used with the FIG. 17 modification.

Referring to a modification of the pocket arrangement in the parts, as shown in FIGS. 17, 18 and 19, the spacing of the drive pockets 10a' (FIG. 17) and the resetting pockets 10b' in the plate 10 are uneven. With this modification of the uneven spacing of the pockets, because the pockets are irregularly spaced, the pockets between the plate 10 and the driven ring 20 can be axially aligned for a driving connection only in one circumferentially matched position. In other words, the parts must be arranged in one particular circumferential relative position to effect a driving engagement. Therefore, the resetting of the coupling in this modification only occurs in one relative position between the parts. This is useful in certain applications where the alignment between the driving and driven shafts must be made in only one position between the shafts and where simply providing matching marks between the shafts is not sufficiently positive.

Figure 20:
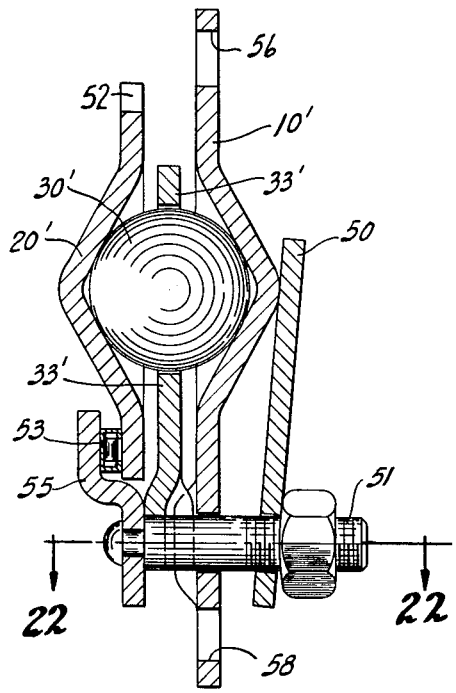
FIGS. 20-22 show a modification of the invention.
Figure 21:
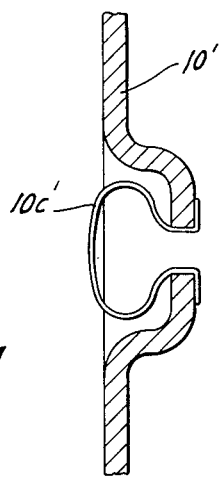
Figure 22:
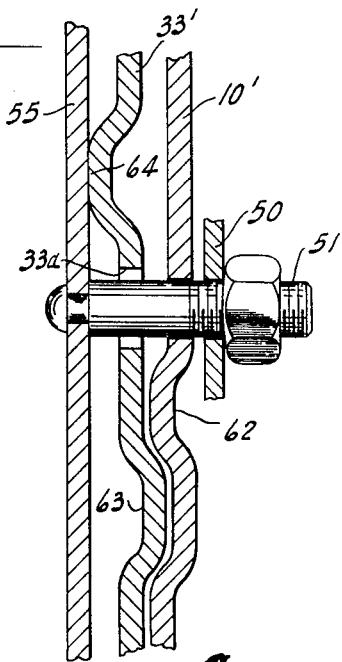

The embodiment shown in FIGS. 20, 21 and 22 is generally the same as to the operation above described, but the plate 10' and ring 20' are fabricated from sheet steel. A belleville spring 50 is located on the stud bolts 51 and provides the resilient loading of the plate 10' towards the driven member 20'. The circumferentially spaced stud bolts 51 support the spring 50, the driving member 10' and driven member 20' and also the ball cage 33'. Holes 33a in the cage provide a solid stop for the cage on bolts 51. The driven member 20' has external teeth 52 around its periphery which can be connected to a member (not shown). Anti-friction needle bearing assembly 53 is provided for journaling the driven member 20' and is located between the member 20' and the plate 55 which is secured on the bolts 51.

The power input can be to the driving member 10' either at the outer edge where power input attaching holes 56 are located or the inner edge where power input attaching holes 58 are located. The center line that is the shaft on which the device is mounted, can be at either side as indicated by the center lines 60 or 61. Ramps 62 and 63 in plate 10' and cage 33' provide the same function as do the keys 36 in the FIG. 1 device. Three sets of these ramps may be provided.

Depressions 64 in the cage may not be essential under all conditions, but they serve to increase the effective thickness of the cage.

The pocket spacings in members 10', 33' and 20' are the same as those in the corresponding parts 10, 33 and 20 of the FIG. 1 – 4 device.

I claim:

1. A rotatable torque limiting coupling comprising, a driving member having an axially shiftable plate, a driven member, said plate and said driven member having opposed transverse surfaces, said plate surface having a plurality of circumferentially spaced drive pockets and reset pockets, said driven member surface having a plurality of circumferentially spaced drive pockets in radial alignment with the pockets of said plate, a plurality of balls located between and abutting against said plate surface and said driven member surface and engagable in said pockets, a ball cage for holding said balls captive therein, spring means located in at least some of said reset pockets of said plate, and resilient means urging said plate towards said driven member surface, whereby when torque over a predetermined amount is applied to said coupling, said balls ride out of said drive pockets, thereby axially separating said plate and driven member to cause disengagement of said coupling, and continued relative rotation between said plate and driven member causes said balls to engage in said reset pockets of said plate, whereby when the relative direction of rotation between said plate and driven member is reversed said spring means push said balls out of said reset pockets and said balls again engage in said drive pockets.

2. The coupling set forth in claim 1 further characterized in that said ball cage has key means abuttable against said plate for holding the latter separated from said driven member surface until said relative rotation is reversed.

3. The coupling as described in claim 2 further characterized in that said plate has an opening in radial alignment with said key means for receiving the latter when said key means is not holding said plate axially separated from said driven member.

4. A torque limiting coupling comprising a generally cylindrical driving member having an axially extending annular flange, a shiftable plate mounted in said flange and fixed thereto for rotation therewith and axially movable relative thereto, a driven member journalled on said driving member and extending axially within said flange for sealing engagement therewith, said plate and said driven member having opposed transverse surfaces, said plate surface having a plurality of circumferentially spaced drive pockets and also having a plurality of circumferentially spaced reset pockets, said driven member surface having a plurality of circumferentially spaced drive pockets in radial alignment with the pockets of said plate, a plurality of balls located between said plate surface and said driven member surface and adapted to abut against said surfaces and engage in said pockets, a cage having a plurality of elongated openings for holding said balls captive therein, spring means located in at least some of said reset pockets of said plate, and resilient means urging said plate towards said driven member surface whereby when torque over a predetermined amount is applied to said coupling, said balls ride out of said drive pockets, thereby axially separating said plate and driven member to cause disengagement of said coupling, and continued relative rotation between said plate and driven member causes said balls to engage in said reset pockets of said plate, whereby when the relative direction of rotation between said plate and said driven member is reversed, said spring means push said balls out of said reset pockets and said balls again engage in said drive pockets.

5. The coupling set forth in claim 4 further characterized in that said ball cage has key means abuttable against said plate for holding the latter separated from said driven member surface until said relative rotation is reversed.

6. The coupling as described in claim 5 further characterized in that said plate has an opening in radial alignment with said key means for receiving the latter when said key means is not holding said plate axially separated from said driven member.

7. A torque limiting coupling comprising a driving member, said driving member having an axially shiftable plate, a driven member, said plate and said driven member having opposed transverse surfaces, said plate surface having a plurality of circumferentially spaced drive pockets and also having a plurality of circumferentially spaced reset pockets, said driven member surface having a plurality of circumferentially spaced drive pockets in radial alignment with the pockets of said plate, a plurality of balls located between said plate surface and said driven member surface and adapted to abut against said surfaces and engage in said pockets, a cage having a plurality of elongated openings for holding said balls captive therein and for limited circumferential travel of said balls in said openings, spring means located in said reset pockets of said plate, and resilient means urging said plate towards said driven member surface whereby when torque over a predetermined amount is applied to said coupling, said balls ride out of said drive pockets, thereby axially separating said plate and driven member to cause disengagement of said coupling, and continued relative rotation between said plate and driven member causes said balls to engage in said reset pockets of said plate, said cage having key means for holding said plate separated from said driven member surface until the relative direction of rotation between said plate and said driven member is reversed whereby said spring means push said balls out of said reset pockets and said balls again engage in said drive pockets, said plate having an opening in radial alignment with said key means for receiving the latter to permit axial movement of said plate towards said driven member.

8. A coupling as defined in claim 1 further characterized in that said plate and driven member are fabricated from sheet metal stampings.

* * * * *